United States Patent
Komulainen

(10) Patent No.: US 7,102,333 B2
(45) Date of Patent: Sep. 5, 2006

(54) CONTROL OF THE MAINS BRIDGE OF A FREQUENCY CONVERTER TO REGENERATE ENERGY FROM THE MOTOR TO THE SUPPLY

(75) Inventor: Risto Komulainen, Klaukkala (FI)

(73) Assignee: Vacon Oyj, Vaasa (FI)

( * ) Notice: Subject to any disclaimer, the term of this patent is extended or adjusted under 35 U.S.C. 154(b) by 233 days.

(21) Appl. No.: 10/820,101

(22) Filed: Apr. 8, 2004

(65) Prior Publication Data

US 2004/0208033 A1    Oct. 21, 2004

(30) Foreign Application Priority Data

Apr. 11, 2003 (FI) .................... 20030552

(51) Int. Cl.
    *H02M 5/45* (2006.01)
(52) U.S. Cl. .......................... 323/37; 323/98; 318/376; 318/800; 318/803
(58) Field of Classification Search ................ 363/157, 363/37, 98, 109; 318/376, 800, 803
    See application file for complete search history.

(56) References Cited

U.S. PATENT DOCUMENTS

| | | | |
|---|---|---|---|
| 4,447,868 A | | 5/1984 | Turnbull |
| 4,449,176 A | * | 5/1984 | Turnbull ...................... 363/81 |
| 4,928,052 A | * | 5/1990 | Fujioka et al. .............. 318/762 |
| 5,256,949 A | * | 10/1993 | Reichard et al. ............ 318/254 |
| 5,491,392 A | * | 2/1996 | Harada et al. .............. 318/376 |
| 5,621,627 A | * | 4/1997 | Krawchuk et al. ............ 363/37 |
| 6,166,513 A | * | 12/2000 | Hammond ................... 318/764 |

FOREIGN PATENT DOCUMENTS

| | | |
|---|---|---|
| EP | 606501 B1 | 7/1993 |
| FI | 108819 B | 3/2002 |
| JP | 62-104481 A | 5/1987 |
| JP | 6-327291 A | 11/1994 |

* cited by examiner

*Primary Examiner*—David M. Gray
*Assistant Examiner*—Harry Behm
(74) *Attorney, Agent, or Firm*—Birch, Stewart, Kolasch & Birch, LLP

(57) ABSTRACT

A method and an apparatus for controlling the mains bridge of a four-quadrant PWM frequency converter provided with a DC intermediate circuit when the power is flowing in the direction towards the supply network, said frequency converter being provided with an AC inductor (9) to be connected to an alternating voltage source ($U_U$, $U_V$, $U_W$), a controlled mains bridge (10), a DC intermediate circuit (14) and a controlled load bridge (11) for feeding a variable-frequency alternating voltage ($U_S$, $U_R$, $U_T$) into a load (12), and said mains bridge being provided with controlled semiconductor switches (V1–V6) and shunt diodes (D1–D6), and wherein the mains bridge (10) is mainly controlled in such manner that the controlled semiconductor switch in the upper branch of the phase having the highest supply voltage instantaneous value and the controlled semiconductor switch in the lower branch of the phase having the lowest supply voltage instantaneous value are conducting. The control of the mains bridge semiconductor switch to be conducting next is advanced by a time sufficient to cause the current of the conducting phase to turn from negative to positive before commutation.

6 Claims, 2 Drawing Sheets

US 7,102,333 B2

Figure 1:
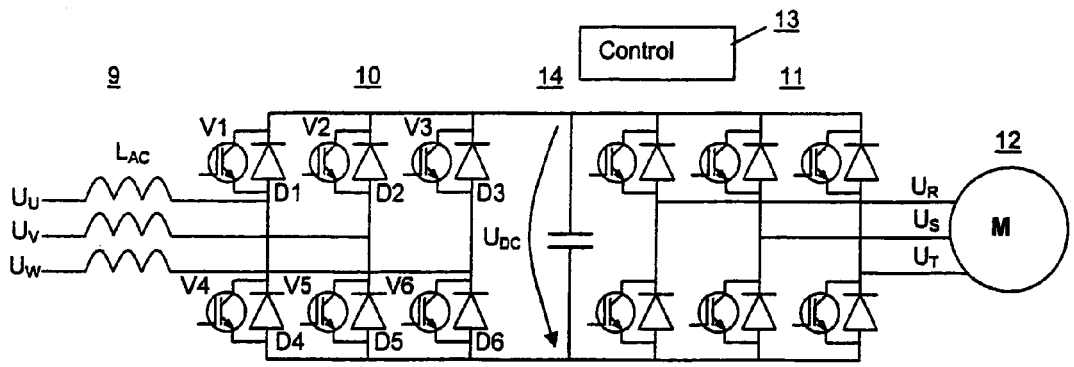

CONTROL OF THE MAINS BRIDGE OF A FREQUENCY CONVERTER TO REGENERATE ENERGY FROM THE MOTOR TO THE SUPPLY

This Nonprovisional application claims priority under 35 U.S.C. § 119(a) on Patent Application No(s). 20030552 filed in Finland on Apr. 11, 2003, the entire contents of which are hereby incorporated by reference.

The present invention relates to control of the mains bridge of a frequency converter in a braking situation where power is flowing in the direction towards the supply network. In particular, the invention relates to a method for controlling the mains bridge of a PWM-type frequency converter, like the one known e.g. from Finnish patent FI 108819 which is able to function in all four quadrants of the power—rotational speed coordinate axes, in a braking situation where power is flowing in the direction towards the supply network, and to a four-quadrant PWM-frequency converter. The method of the invention for controlling the mains bridge is also directly applicable in prior-art PWM-frequency converters having an intermediate circuit capacitor rated for use as an energy storage.

Voltage-controlled PWM-frequency converters have a mains bridge for rectification of the alternating voltage of the supply network to produce an intermediate circuit d.c. voltage and a load bridge for inversion of the intermediate-circuit direct voltage to produce a variable-frequency alternating voltage when power is flowing from the network towards the load. The frequency converter feeds a three-phase load, such as a cage induction motor, which can be used in many applications, for example in pumps and fans. The load bridge is a full-wave bridge provided with PWM-controlled semiconductor switches and diodes connected in inverse-parallel with these.

The load bridge may be a controlled full-wave bridge, in which case it is provided with controlled semiconductor switches, such as IGBT, and diodes connected in inverse-parallel with them. In a controlled mains bridge, power may flow from network to load or also from load to network e.g. in situations where the motor is being braked.

A specific function of the mains bridge is to ensure that the intermediate circuit current has an unobstructed flow path to the supply network regardless of the direction of the current. In the mains bridge of the present invention, the existence of a current flow path is ensured by controlling the mains bridge semiconductor switches in a manner such that the controlled semiconductor switch in the upper branch of the phase having the highest supply voltage instantaneous value and the controlled semiconductor switch in the lower branch of the phase having the lowest supply voltage instantaneous value are conducting through 120° at a time.

The control of the mains bridge and the ratings of the main components should be designed with an aim to prevent excessive distortion of the voltage at the coupling point of the frequency converter.

The supply voltage is distorted especially in the commutation situation. When the intermediate circuit current is positive, i.e. when power is flowing towards the motor, the mains bridge current flows exclusively through the shunt diodes. When the current commutes from one phase to the next, a small commutation notch appears in the coupling point voltage as the two phases are conducting simultaneously and a larger notch of a shorter duration appears as the reverse current of the diode being turned off is interrupted and possibly transferred for an instant even to the diode of the opposite branch. One can do nothing about this phenomenon but, as is well known, the voltage notch appearing at the coupling point can be reduced e.g. by connecting small capacitors or RC protectors between the phases of the mains bridge.

In a braking situation the case is worse. The mains bridge current now flows through the IGBTs, and if the control timing is the normal 120°, then the commutation notches are deep and of long duration, as will be described below in connection with FIGS. 2a and 2b.

The object of the present invention is to overcome the drawbacks of prior art and achieve a new type of control arrangement that is especially applicable for the control of the mains bridge of a four-quadrant frequency converter.

According to the invention, the commutation notch appearing in a braking situation can be eliminated or significantly diminished by turning the conducting phase current positive just before commutation. This is achieved by advancing the control of the IGBT the more the larger is the negative current in the braking situation.

The features characteristic of the control method of the invention for controlling the mains bridge and those of the corresponding frequency converter are presented in detail in the claims below.

By controlling the mains bridge by the method of the invention, distortion of the mains voltage in a braking situation is avoided and, in regard of mains-borne disturbances, the operation is of the same level with frequency converters provided with a diode bridge in which the power flows towards the motor.

Figure 2A:
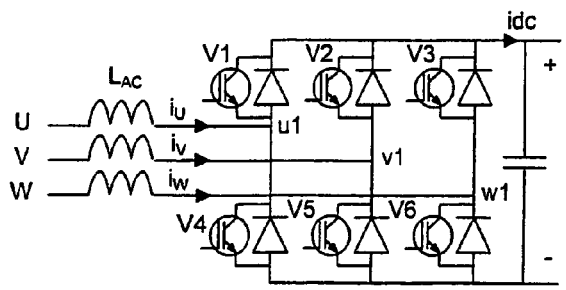
Figure 2B:
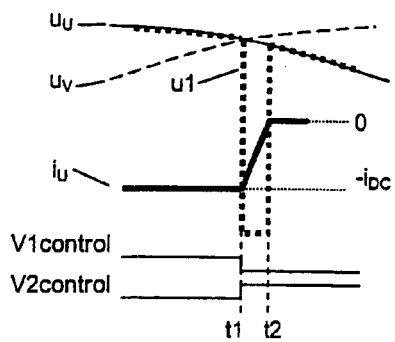
Figure 3A:
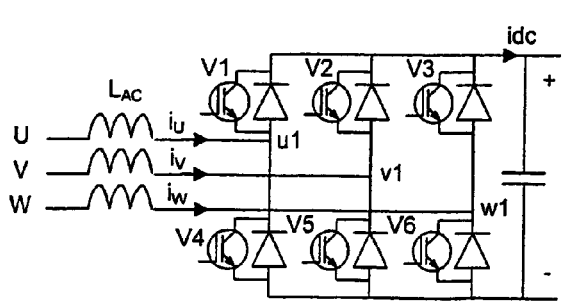
Figure 3B:
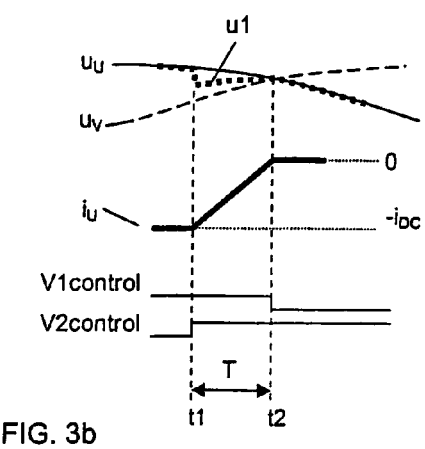
Figure 4:
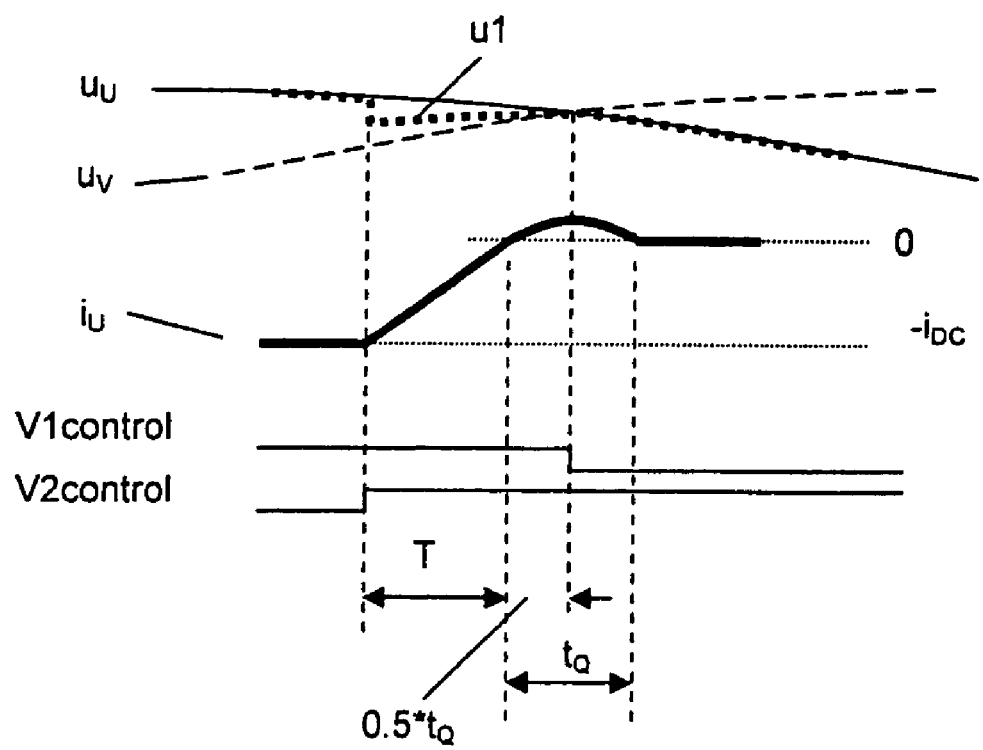

In the following, the invention will be described in detail with reference to an example and the attached drawings, wherein FIG. 1 presents a four-quadrant, voltage-controlled PWM frequency converter, FIGS. 2a and 2b illustrate a prior-art solution for controlling the mains bridge of a frequency converter as presented in FIG. 1 in a braking situation, FIGS. 3a and 3b illustrate a solution according to the invention for controlling the mains bridge of a frequency converter as presented in FIG. 1 in a braking situation, and FIG. 4 illustrates a solution according to the invention for controlling the mains bridge of a frequency converter as presented in FIG. 1 in a braking situation when the mains bridge is provided with thyristors instead of IGBTs.

FIG. 1 presents a three-phase voltage-controlled PWM-frequency converter provided with an AC inductor 9 for limiting supply network harmonics, a mains bridge 10 for rectification of three-phase supply voltage consisting of phase voltages $U_U$, $U_V$, $U_W$ to produce an intermediate-circuit DC voltage $U_{DC}$, an intermediate circuit capacitor 14, which may function either as an energy storage or as a limiter of voltage spikes, and a load bridge (inverter) 11 for inversion of the direct voltage of the DC intermediate circuit to produce a variable-frequency three-phase alternating voltage consisting of phase voltages $U_R$, $U_S$, $U_T$. The frequency converter feeds a three-phase cage induction motor (M) 12. The load bridge 11 is a full-wave bridge with a control unit 13 controlling by pulse width modulation the semiconductor switches of each phase, which are connected in inverse-parallel with shunt diodes.

The mains bridge 10 is a controlled full-wave bridge in which power may flow in the direction from mains to load and also for load to mains e.g. when the motor is being braked. Each branch of the mains bridge 10 contains controllable semiconductor switches V1–V6, such as IGBTs, and diodes (shunt diodes) D1–D6 connected in inverse-parallel with them. Such a circuit permits the flow of the negative intermediate circuit current Idc in the direction of the supply network. The mains bridge 10 is controlled in a manner such that the IGBT in the upper branch of the phase having the highest instantaneous voltage value is conducting and the IGBT in the lower branch of the phase with the lowest instantaneous voltage value is conducting. In other words, the IGBTs are held in the conducting state if the diodes in parallel with them are conducting when the power is flowing towards the motor.

In a braking situation, the mains bridge current flows through the IGBTs, and if the timing of the control signal is a constant 120° as in prior art, then the commutation notches are deep and of long duration, as is evident from FIGS. 2*a* and 2*b* and the following description, which present an example of how the current passes from phase U to phase V:

1) Before instant t1:
   the voltage of phase U is the most positive, and consequently V1 is conducting and the negative intermediate circuit current $-i_{DC}$ flows through V1

=>voltage at point $u1$=voltage+$U$dc≈$U$-phase voltage

W-phase voltage (not shown in the figures) is the most negative, and consequently V6 too is conducting =>voltage at point $w1$=−$U$dc≈$W$-phase voltage 2) At instant t1:
   phase V becomes more positive than phase U, so V1 is turned off and V2 is turned on
3) Between instants t1 ... t2:
   U-phase negative current $i_U$ starts flowing through the shunt diode of V4, so the voltage at point $u1$ is now the same as voltage $-U$dc
   as seen from the direction of the supply network, phases U and W are thus shorted behind the AC inductor, which is why at the coupling point a commutation notch appears in the main voltage between these phases, the depth of the notch being determined by the voltage distribution between the AC inductor $L_{AC}$ and the supply network inductances
4) At instant t2:
   the current in phase U has been reduced to a level low enough to turn the shunt diode of V4 off and the voltage at point $u1$ begins following the U-phase voltage.

According to the present invention, the occurrence of a commutation notch in a braking situation can be prevented by turning the conducting phase current positive just before commutation. This is accomplished by advancing the control of the IGBT the more the larger is the negative current in a braking situation. The IGBT to be conducting next is turned on before the firing instant determined by the normal 120° firing rule, with an anticipation sufficient to cause the direction of the conducting phase current to be turned from the IGBT to the shunt diode before the control signal to the previously conducting IGBT is interrupted. Thus, the control signals to the IGBTs overlap by the anticipation T. In the above-described example situation, this means what follows (FIGS. 3*a* and 3*b*):

1) At instant t1:
   V2 is turned on with an anticipation while the V-phase voltage is still more negative than the U-phase voltage, V1 continues conducting
2) Between instants t1 ... t2:
   as seen from the direction of the supply network, phases U and V are shorted behind the AC inductor, but as the voltages in these phases are nearly equal, the commutation notch appearing at the coupling point is small U-phase negative current decreases towards zero and correspondingly V-phase current increases in the negative direction
3) At instant t2:
   U-phase current has fallen to zero or, depending on the accuracy of the anticipated timing, even turned positive. The control signal to V1 is interrupted and the negative intermediate circuit current continues flowing through V2.

As stated above, in a braking situation the firing has to be advanced by a length of time sufficient to cause the current of the previously conducting IGBT to be interrupted or turned to the shunt diode before its control signal is interrupted. The required anticipation T1 can be calculated on the basis of the intermediate circuit current (which can be calculated from the known motor power and the intermediate-circuit DC voltage), the supply network frequency, the inductance of the AC inductor and the supply network voltage according to equation (1):

$$T1 = \frac{1}{2f} \times \left\{ 1 - \frac{1}{\pi} \times \left[ \cos^{-1}\left( \frac{\sqrt{2} \times \pi \times f \times L \times i_{DC}}{U} - 1 \right) \right] \right\} \quad (1)$$

where T1=anticipation [sec.]
   f=supply network frequency [Hz]
   L=sum of the inductances of two supply phases [H]
   $i_{DC}$=magnitude of DC current (can be calculated from motor power)
   U=supply network main voltage If the anticipation is too long, the only consequence is that the current through the shunt diode grows somewhat larger than would be strictly necessary. By contrast, if the anticipation time is too short, the current flowing through the IGBT will not be interrupted before the control pulse is removed, and this leads to a deep commutation notch.

It is obvious to the person skilled in the art that different embodiments of the invention are not limited to the example described above, but that they may be varied within the scope of the claims presented below. In the mains bridge it is also possible to use GTO thyristors or even ordinary thyristors instead of gate turn-off IGBTs, in which case the thyristor recovery time $t_Q$ will have to be taken into account in determining the anticipation as illustrated in FIG. 4. When thyristors are used, the anticipation has to be long enough to cause the conducting phase current to be turned positive in the commutation situation with an advance equal to at least $0.5 \ast t_Q$ before the voltage of the previously conducting phase stops being the most positive/negative. A positive current now flows through the shunt diode connected in parallel with the thyristor for at least a time equal to $t_Q$, guaranteeing that the thyristor is turned off. When thyristors are used, the anticipation time has to be at least $T2+0.5 \ast t_Q$, where $$T2 = \frac{1}{2f} \times \left\{ 1 - f \times t_Q - \frac{1}{\pi} \times \cos^{-1}\left[ \frac{\sqrt{2} \times \pi \times f \times L \times i_{DC}}{U} + \cos(\pi \times (1 - f \times t_Q)) \right] \right\}. \quad (2)$$

The invention claimed is:
1. A method for controlling the mains bridge of a four-quadrant PWM frequency converter provided with a DC intermediate circuit when the power is flowing in the direction towards the supply network, comprising:
providing said frequency converter with an AC inductor to be connected to an alternating voltage source, a controlled mains bridge, a DC intermediate circuit and a controlled load bridge for feeding a variable-frequency alternating voltage into a load, and providing said mains bridge with controlled semiconductor switches and shunt diodes; and
controlling the mains bridge so that the controlled semiconductor switch in the upper branch of the phrase having the highest supply voltage instantaneous value and the controlled semiconductor switch in the lower branch of the phase having the lowest supply voltage instantaneous value are conducting;
advancing the control of the mains bridge semiconductor switch to be conducting next by a time sufficient to cause the current of the conducting phase turned from negative to positive before commutation, the size of the time being determined by the size of the current in said mains bridge.

2. A method according to claim 1 in a frequency converter wherein the mains bridge semiconductor switches are gate turn-off components, such as IGBTs,
and the control of the switch to be conducting next is advanced by at least a time step T1, where $$T1 = \frac{1}{2f} \times \left\{1 - \frac{1}{\pi} \times \left[\cos^{-1}\left(\frac{\sqrt{2} \times \pi \times f \times L \times i_{DC}}{U} - 1\right)\right]\right\}$$

3. A method according to claim 1 in a frequency converter wherein the semiconductor switches in the mains bridge are thyristors having a recovery time of ($t_Q$),
and the control of the thyristor to be conducting next is advanced by at least a time step $T2+0.5*t_Q$, where $$T2 = \frac{1}{2f} \times \left\{1 - f \times t_Q - \frac{1}{\pi} \times \cos^{-1}\left[\frac{\sqrt{2} \times \pi \times f \times L \times i_{DC}}{U} + \cos(\pi \times (1 - f \times t_Q))\right]\right\}.$$

4. A four-quadrant PWM frequency converter, comprising:
a mains bridge, said mains bridge being controlled by means of a control unit so the power flows in the direction towards the supply network;
an AC inductor connected to an alternating voltage source, a DC intermediate circuit and a controlled load bridge for feeding a variable-frequency alternating voltage into a load, said mains bridge being provided with controlled semiconductor switches and shunt diodes;
the mains bridge being controlled so that the controlled semiconductor switch in the upper branch of the phase having the highest supply voltage instantaneous value and the controlled semiconductor switch in the lower branch of the phase having the lowest supply voltage instantaneous value are conducting;
the control unit advancing the control of the semiconductor switch to be conducting next by a time sufficient to cause the current of the conducting phase to turn from negative to positive just before commutation, the size of the time being determined by the size of the current in said mains bridge.

5. A frequency converter according to claim 4, wherein the mains bridge semiconductor switches are gate turn-off components, such as IGBTs,
and the control unit advances the control of the mains bridge semiconductor switch to be conducting next by at least time T1, where $$T1 = \frac{1}{2f} \times \left\{1 - \frac{1}{\pi} \times \left[\cos^{-1}\left(\frac{\sqrt{2} \times \pi \times f \times L \times i_{DC}}{U} - 1\right)\right]\right\}.$$

6. A frequency converter according to claim 4, wherein the mains bridge semiconductor switches are thyristors having a recovery time ($t_Q$),
and the control unit advances the control of the thyristor to be conducting next by at least time $T2+0.5*t_Q$, where $$T2 = \frac{1}{2f} \times \left\{1 - f \times t_Q - \frac{1}{\pi} \times \cos^{-1}\left[\frac{\sqrt{2} \times \pi \times f \times L \times i_{DC}}{U} + \cos(\pi \times (1 - f \times t_Q))\right]\right\}.$$

* * * * *